United States Patent [19]

Negoro

[11] Patent Number: 4,555,165

[45] Date of Patent: Nov. 26, 1985

[54] ZOOM LENS BARREL FOR VARIABLE MAGNIFICATION TYPE COPYING MACHINE

[75] Inventor: Ikuo Negoro, Tokyo, Japan

[73] Assignee: Asahi Kogaku Kogyo Kabushiki Kaisha, Tokyo, Japan

[21] Appl. No.: 654,576

[22] Filed: Sep. 26, 1984

[30] Foreign Application Priority Data

Oct. 3, 1983 [JP] Japan ................. 58-186084

[51] Int. Cl.⁴ .................. G02B 7/11; G03B 27/10
[52] U.S. Cl. ........................ 350/429; 355/55
[58] Field of Search ............ 350/429, 255; 355/55, 355/56

[56] References Cited

U.S. PATENT DOCUMENTS 2,529,894 11/1950 Altman et al. ............... 350/429
3,765,748 10/1973 Mito .......................... 350/429

*Primary Examiner*—John K. Corbin
*Assistant Examiner*—Loha Ben
*Attorney, Agent, or Firm*—Sughrue, Mion, Zinn, Macpeak & Seas

[57] ABSTRACT

A zoom lens barrel for a variable magnification type copying machine in which the lenses are readily mounted and adjusted and the optimum angular positions thereof employed. Two movable lenses are fixedly held by respective movable lens frames, the latter being inserted into an axial hole formed in a single movable lens barrel which is moved in the axial direction as the magnification setting of these zoom lenses vary. At least one of the movable lens frames is fixedly secured to the movable lens barrel, while the other movable lens frame is supported in the movable lens barrel in such as a manner as to move in the axial direction as the magnification changes. The one movable lens frame includes a first mechanism for adjusting the angular position of the one movable lens frame with respect to the movable lens barrel without moving the movable lens frame in the axial direction, and a second mechanism for adjusting the position of the one movable lens frame in the axial direction thereof.

4 Claims, 11 Drawing Figures

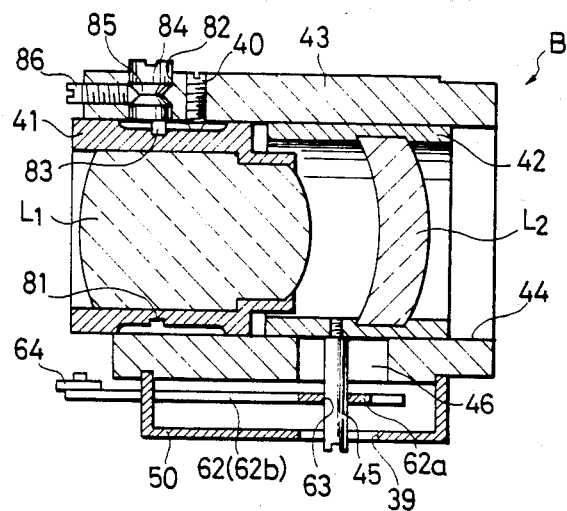
FIG. 9
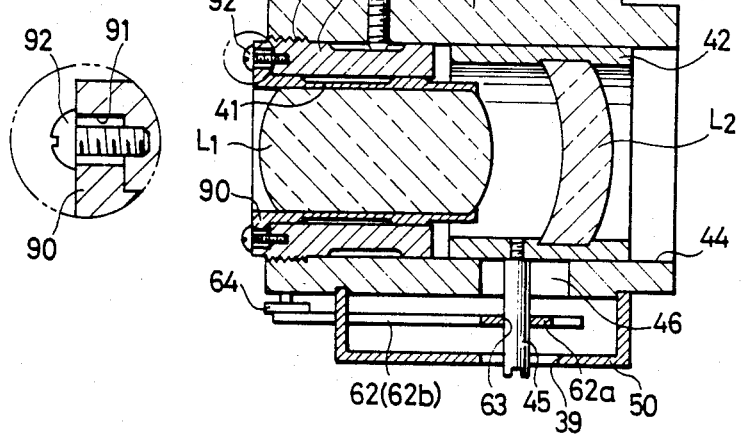
FIG. 10A
FIG. 10

ZOOM LENS BARREL FOR VARIABLE MAGNIFICATION TYPE COPYING MACHINE

BACKGROUND OF THE INVENTION

The invention relates to a variable magnification type copying machine with a zoom lens. More particularly, the invention relates to the structure of a zoom lens barrel with two movable lenses for use in such a copying machine.

FIG. 1 shows an example of the loci traced by a front lens group L1 and a rear lens group L2, forming a copying zoom lens L, in moving between magnification settings. In this case, an original surface (original platen) D and a photosensitive surfaces S are fixed, that is, the distance between the object and its image remain unchanged.

FIGS. 2 through 4 show an example of the construction of a conventional variable magnification type copying machine in which the front lens group L1 and the rear lens group L2 are moved along the above-descried loci. In FIG. 2, an original platen D and a zoom lens L, composed of a front lens group L1 and a rear lens group L2, are the same as those shown in FIG. 1, and a photosensitive surface S is the surface of a photosensitive drum. The original platen D is a transparent plate such as a transparent glass plate. A "full-speed" mirror M1, which moves together with an illuminating lamp R1, is provided below the original platen D. A light beam reflected from the full-speed mirror M1 is received by optical path changing mirrors M2 and M3 which are supported so as to be movable as a single unit. In order to maintain the optical path length unchanged, the mirrors M2 and M3 are moved in the same direction as the full-speed mirror M1 but at half the speed of the full-speed mirror M1. Therefore, the mirrors M2 and M3 are sometimes called "half-speed" mirrors. The direction of advance of the light beam reflected by the full-speed mirror M1 is changed 180° by the optical path changing mirrors M2 and M3 so that the light beam is applied through the zoom lens L to a fourth mirror M4. The light beam is reflected by the fourth mirror M4 so that it is applied to the photosensitive drum S, which rotates in synchronization with the full-speed mirror M1 (speed of full-speed mirror M1=(1/magnification)×peripheral speed of drum S). In order to change the magnification, the movable lens groups L1 and L2 of the zoom lens L are moved along the optical axis, and the distance between these lens groups is set as described with reference to FIG. 1.

FIGS. 3 and 4 shows an example of a conventional mechanism for moving the movable lens groups L1 and L2. In the lens group moving mechanism, the force of movement of the front lens group L1 is used to move the rear lens group L2 with the aid of a cam. In these figures, reference character F designates the optical axis of the zoom lens L, and 11 a guide bar secured to supporting brackets 13 on a base 12 and mounted parallel to the optical axis F. A zoom lens frame 14 composed of a first frame 14A and a second frame 14B is slidably mounted on the guide bar 11. Guide rollers 15 are provided at the end of the zoom lens frame 14 which roll on a guide rail 16 fixedly provided on the base 12 and extending parallel to the guide bar 11.

The front lens group L1 is supported by a first lens barrel 17 which is screwed into the first frame 14A so as to be fixedly secured thereto, as shown in FIG. 4. The rear lens group L2 is supported by a second lens barrel 18 which, as in the case of the first lens barrel 17, is screwed into the second frame 14B so as to be fixedly secured thereto. The first and second frames 14A and 14B are movably mounted on the guide bar 11 in such a manner that the second frame 14B is movable with respect to the first frame 14A A feed screw 22 is supported by the supporting brackets 13 parallel to the guide bar 11. The feed screw 22 thus supported is threadably engaged with an arm 21 which is extended from one end of the first frame 14A. The feed screw 22 is driven by a stepping motor (or a pulse motor) 23, whose rotational position is controllable, via a timing pulley 24, a timing belt 25 and a timing pulley 26.

A shaft 28 is supported by the first frame 14 perpendicular to the optical axis F. A distance adjusting member, namely a cam plate, is rotatably mounted on the shaft 28. A cam follower 30 adapted to abut against the peripheral cam surface of the cam plate 29 extends from the second frame 14B to which the second lens barrel 18 has been secured as described above. The cam plate 29 and the cam follower 30 are maintained in elastic contact with each other by a tension spring 31. Therefore, as the cam plate 29 rotates, the second frame 14B, and accordingly the second lens barrel 18, is moved along the optical axis F along a locus determined according to the configuration of the cam surface of the cam plate 29. The cam plate 29 is shaped so that the rear lens group L2 supported by the second lens barrel 18 is moved along the locus G shown in FIG. 1.

The cam plate 29 is coupled via a shaft to a wire drive pulley 33. The wire drive pulley can be turned relative to the shaft for phase adjustment, and it is fixed to the shaft after the phase adjustment has been accomplished. A flexible wire 35, fixedly secured at a center point to the wire drive pulley 33 with a small screw or the like, is wound on the wire pulley 33. The opposed ends of the wire 35 are fastened to respective ones of the supporting brackets 13.

In the conventional device thus constructed, as the feed screw 22 is rotated by the stepping motor 23, the first frame 14A is moved along the guide bar 11, and the zoom lens L composed of the front lens group L1 and the rear lens group L2 is moved, in its entirety, along the optical axis F. In this operation, according to the magnification selected, the first frame 14A follows a locus equal to the locus E of the front lens group L1 in FIG. 1.

The middle part of the wire 35 is fixedly secured to the wire drive pulley 33 and its ends thereof are fixedly fastened to the supporting brackets, as described above. Therefore, as the first frame 14A is moved, the wire drive pulley 33, and accordingly cam plate 29 (which is mounted on the same shaft as the wire pulley), are turned through an angle corresponding to the amount of movement of the first frame 14A. Thus, the second lens barrel 18 (and hence the second frame 14B) is moved according to the configuration of the cam plate 29 with the aid of the cam follower 30, which is elastically abutted against the cam plate 29, so that the distance between the front lens group L1 and the rear lens group L2 is set to a value corresponding to the desired magnification, that is, the rear lens group L2 is moved along the curve G in FIG. 1.

In the conventional machine, the mechanism for supporting and adjusting the front and rear lens groups L1 and L2 forming the zoom lens L suffers from a drawback in that the first and second lens barrels 17 and 18 are screwed into the first and second frame 14A and 14B to be secured thereto, as described above. In this connection, in order to prevent the lenses thus held from being inclined, the threaded parts should be relatively long. Therefore, it takes a relatively long period of time to machine and assemble those parts.

Moreover, the initial position of the zoom lens in the direction of the optical axis is adjusted by turning the first lens barrel 17 and the second lens barrel 18. However, they cannot be turned under the condition that the position in the direction of the optical axis has been determined, and therefore, the best part of the performance of the zoom lens cannot be effectively used. This will be described in more detail.

In the above-described variable magnification type copying machine, as shown in FIG. 5, a light beam reflected from the original surface D is applied through the lens groups L1 and L2 to the photosensitive drum S where it forms a slit-shaped image. Therefore, the lens groups L1 and L2 need provide their optimum performance in a particular direction, that is, only for the slit-shaped image formed on the photosensitive drum S. Ideally, a lens should form a completely uniform circular image, but it is difficult to manufacture a lens which is uniform in performance for all parts of the circular image because errors are generally involved in its manufacture. In other words, the best part of the performance of the lens for the slit-shaped image can be found by turning the lens. However, with the conventional approach for adjusting the position of the lens in the direction of the optical axis, this cannot be done without changing the lens's position in the direction of the optical axis. Accordingly, it is necessary to use a lens which exhibits uniform performance.

The lens groups L1 and L2 should not be inclined and shifted after they are assembled. However, with the conventional construction in which the first lens barrel holding the lens group L1 and the second lens barrel holding the lens group L2 are screwed into the first frame 14A and the second frame 14B, respectively, and the first frame 14A and the second frame 14B are guided respectively by the guide bar 11 and the guide rail 16, the desired performance cannot be obtained without using precision components and without assembling those components with a high accuracy. For instance, the axes of the threaded parts formed on the outer walls of the first and second lens barrels 17 and 18 should be established accurately with respect to the holes which are cut in the first and second frames 14A and 14B to receive the guide bar, the guide bar 11 and the guide rail 16 should be strictly parallel and the positional accuracy of the rollers 15 rolling on the guide rail 16 with respect to the threaded parts should also be maintained high. However, it is considerably difficult to do so, and these requirements cannot be met without a high manufacturing cost and much maintenance.

SUMMARY OF THE INVENTION

In view of the above-described difficulties accompanying a conventional copying machine's magnification varying unit, an object of the invention is to provide a zoom lens barrel which eliminates these difficulties.

In accordance with the above and other objects, there is provided a zoom lens barrel in which lens frames holding the movable lenses are inserted into an axial hole formed in a single movable lens barrel which is moved in the axial direction as the magnification changes, at least one of the movable lens frames is fixedly secured to the movable lens barrel while the other is supported in the movable lens barrel so that it is moved in the axial direction as the magnification changes. The one movable lens frame has first means for adjusting the angular position of the one movable lens frame with respect to the movable lens barrel without moving the one movable lens frame in the axial direction, and second means for adjusting the position of the one movable lens frame in the axial direction.

The reason why only one of the movable lens frames has the first and second means is that, in a lens system composed of a plurality of lens groups for handling a slit-shaped light beam only, its best operating position can be obtained by rotating only one of the lens groups or adjusting its position in the axial direction, or a variation in focal length can be corrected. This fact has been found from experience.

BRIEF DESCRIPTION OF THE DRAWINGS

FIGS. 9 and 10 are sectional views showing second and third examples of a zoom lens barrel according to the invention.

FIG. 10A shows a small portion of FIG. 10.

DESCRIPTION OF THE PREFERRED EMBODIMENTS

Figure 1:
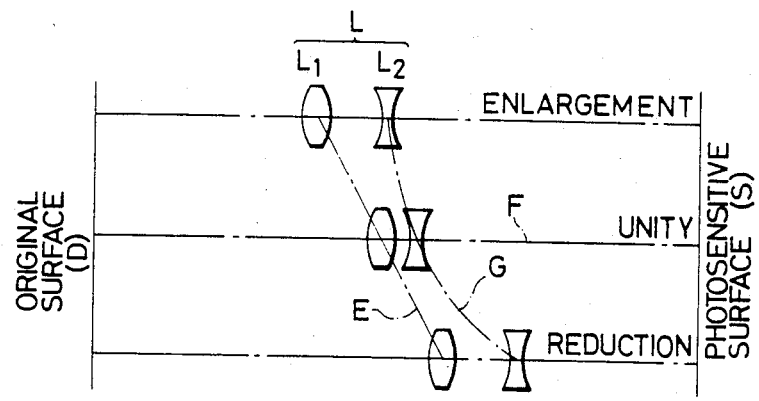
FIG. 1 is an explanatory diagram showing the positions of a zoom lens with respect to an original surface and a photosensitive surface as the magnification changed.

The invention will now be described with reference to preferred embodiments shown in the drawings.

Figure 6:
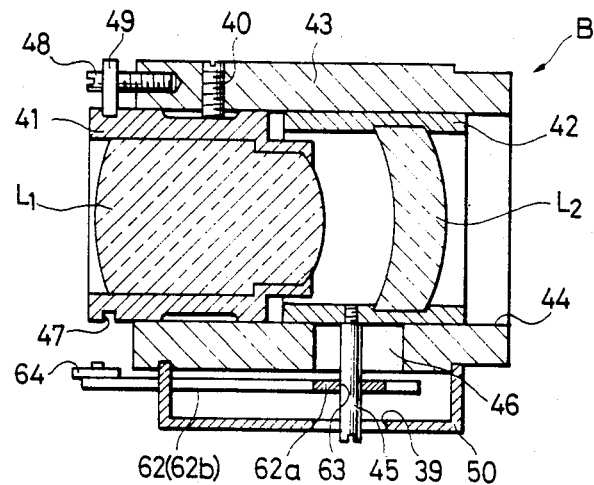
FIG. 6 is a sectional view taken along a line VI—VI in FIG. 7 and showing a first example of a zoom lens barrel according to the invention.
Figure 7:
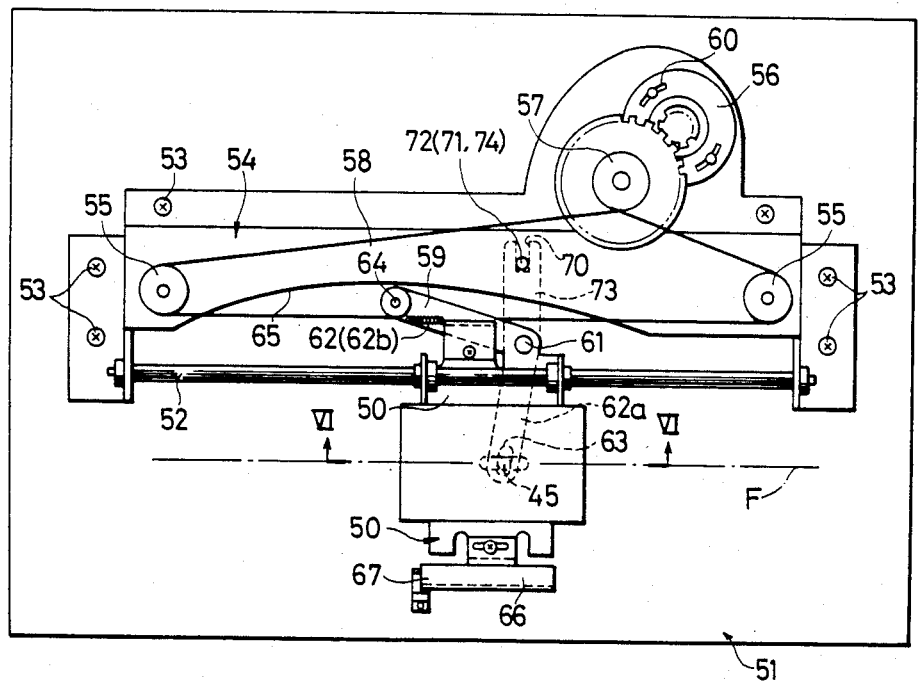
FIG. 7 is a plan view of a variable magnification type copying machine employing the zoom lens barrel shown in FIG. 6.

FIG. 6 shows a first example of a zoom lens barrel B according to the invention. The zoom lens barrel B is adapted to be mounted on a variable magnification type copying machine as shown in FIG. 7, which is different in construction from the conventional machine described above. In FIG. 6, a front lens group L1 and a rear lens group L2 form the same zoom lens L as that in the conventional device. The front lens group L1 and the rear lens group L2 are respectively held by a front lens group frame 41 and a rear lens group frame 42 in a conventional manner. The two frames 41 and 42 are inserted into an axial hole 44 formed in a single movable lens barrel 43. The axial hole 44 is uniform in diameter and extends straightly. The front lens group frame 41 is fixedly secured to the movable lens barrel 43, while the rear lens group frame 42 is supported by the movable lens barrel 43 in such a manner that it is movable along the optical axis. However, before they are assembled, the frames are rotatable and movable in the axial direction in the movable lens barrel 43. The rear lens group frame 42 has an interlocking pin 45 extending radially. The pin 45 is inserted through an idle hole 46 formed in the movable lens barrel into a straight movement guide groove 39 formed in a slide plate 50 adapted to fix the position of the movable lens barrel 43, with the interlocking pin preventing rotation of the lens frame 42 and permitting movement of the latter only in the direction of the optical axis. Further, an annular groove 47 is formed circumferentially in the outer wall of the front part of the front lens group frame 41 which protrudes from the movable lens barrel 43. An interlocking plate 49 coupled to an adjusting screw 48 which is screwed into the end face of the movable lens barrel 43 is fitted in the annular groove 47. The interlocking plate 49 is coupled to the adjusting screw 48 so that the former is rotatable around the latter and is moved together with the latter in the axial direction. A retaining screw 40 is used to fixedly secure the front lens group frame 41 to the movable lens barrel 43.

In the zoom lens barrel B thus constructed, when the adjusting screw 48 is turned with the retaining screw 40 loosened, the interlocking plate 49 in the annular groove 47 is moved, thereby to adjust the position of the front lens group frame 41 in the direction of the optical axis. If the front lens group frame 41 is turned after the adjustment of its position in the direction of the optical axis, then with the aid of the interlocking plate 49 engaged with the annular groove 47, the lens frame can be turned without moving it in the direction of the optical axis. Accordingly, it is possible to determine the angular position of the front lens group L1 at which the latter shows the best performance. After this adjustment, the front lens group frame 41 is secured to the movable lens barrel 43 with the retaining screw 40.

In this adjustment, it is necessary to turn the rear lens group frame 42 in the same manner. The best position for the slit-shaped light beam can be found by turning one of the frames as described above. It has been found through experience that there is no merit to adjusting both of the lens frames for adjustment when adjustment time, etc. are taken into account. Variation in focal length can be accomplished by adjusting only the position of the front lens group frame 41 in the axial direction.

The above-described zoom lens barrel B is fixedly mounted on the slide plate 50 of a variable magnification type copying machine which is shown in FIG. 7. The slide plate 50 is slidably mounted on a guide shaft 52 above a base plate 51. The guide shaft 52 is fixedly secured to both end portions of a cam plate 54, which is mounted on the base plate 51 with screws 53. The guide shaft 52 is used to guide the front lens group L1 and the rear lens group L2 along the optical axis F.

As shown in FIG. 7, pulleys 55 and 55 are provided on respective right and left end portions of the cam plate 54, and a wire drive pulley driven by a stepping motor 56 is provided on the upper end portion of the cam plate 54. A flexible wire 58 is laid over the pulleys 55 and 57. One end of the wire 58 is fastened to the slide plate 50, while the other end is elastically attached to the slide plate 50 through a tension spring 59. The tension spring 59 is used to absorb any shocks which may be caused when the slide plate 50 is moved or stopped and to correct for dimensional errors of the wire 58 and for any stretching of the wire 58 which may occur during use. The stepping motor 56 has arcuate mounting holes 60 for phase adjustment.

A cam lever 62 is pivotally mounted on a pin 61 which is fixed to the slide plate 50. The cam lever 62 is substantially L shaped, having an arm 62a extending towards the zoom lens barrel B and an arm 62b extending toward the cam plate 54. The arm 62a has an elongated groove 63 into which the above-described locking pin 45 is inserted. The arm 62b has a cam follower 64. The cam follower 64 is urged by a spring, such as a torsion spring wound on the pin 61, so that it is maintained in contact with the cam surface 65 of the cam plate 54 at all times. The cam surface 65 is shaped so that it acts with the slide plate 50 to cause the rear lens group L2 to move along the locus G shown in FIG. 1.

A position detecting plate 66 is coupled to an end portion of the slide plate 50 opposite to the end portion where the cam lever 62 is provided. The position detecting plate 66 is displaceable in the direction of the optical axis. The position detecting plate 66 is adapted to pass through the U-shaped part of a photo interrupter 67 which is mounted on the base plate 51. The zoom lens is in the enlargement range when the position detecting plate 66 intercepts the light beam of the photointerrupter 67, and it is in the reduction range when the plate 66 is not in such a position. The life size (magnification ×1) position is set at the position where the position detecting plate 66 just starts intercepting the light beam of the photointerrupter 67, that is, the position where the output of the photointerrupter 67 abruptly changes. The position detecting plate 66 and the photointerrupter 67 form a conventional position detector as used in the conventional device. Therefore, the construction of the position detector is not included in the invention.

Figure 8:
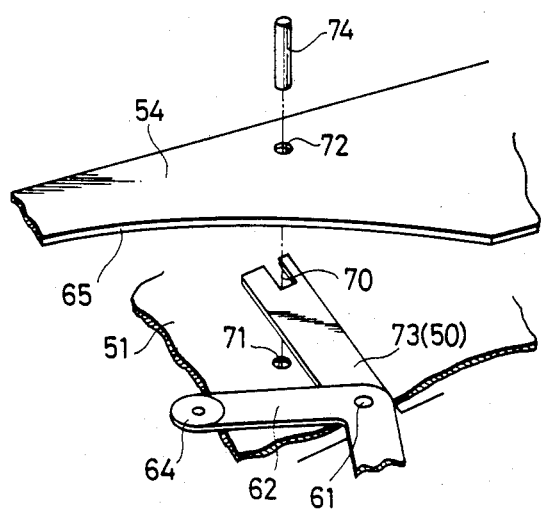
FIG. 8 is a perspective view of components used for positioning a slide plate, a base plate and a cam plate in the copying machine of FIG. 7.

As is clearly shown in FIG. 8, an elongated groove or hole 70, a small hole 71 and a small hole 72 are formed in the slide plate 50, the base plate 51 and the cam plate 54, respectively, for positioning these plates during assembly. The elongated groove 70 is formed in a positioning arm 73 extending below the cam plate 54 in such a manner that the groove 70 extends perpendicular to the direction of movement of the slide plate 50. The positions of the elongated groove 70, the small hole 71 and the small hole 72 are determined so that, with a positioning pin 74 inserted into the groove 70 and the small holes 71 and 72, the plates 50, 51 and 54 are set, for instance, for a predetermined magnification, for instance, ×1. After assembly, the positioning pin 74 is removed. The reason why the elongated groove 70 instead of a hole is formed for positioning the slide plate 50 is that the slide plate 50 should be positioned in the direction of its movement and the positioning pin 74 can be more readily inserted into the elongated groove 70. The above-described positioning operation may be performed for the enlargement or reduction position of a predetermined magnification.

In the variable magnification type copying machine thus constructed, when the stepping motor 56 is driven, the slide plate 50, and accordingly the zoom lens L composed of the front lens group L1 and the rear lens group L2, are moved along the optical axis F with the aid of the wire drive pulley 57, the pulleys 55 and the wire 58, while the rear lens group L2 is moved towards the front lens group L1 by cooperation of the cam surface 65, the cam follower 64, the cam lever 62, the interlocking groove 63, the interlocking pin 45 and the rear lens group frame 42. The loci of the front lens group L1 and the rear lens group L2 coincide with the curves E and G shown in FIG. 1.

With this arrangement, a well-focused copy is obtained for each copying magnification. The slide plate 50 can be stopped at each copying magnification position by the stepping motor 56. The copying magnification may be changed either continuously or in steps.

In the inventive variable magnification type copying machine, unlike the conventional machine, the position of the rear lens group L2 is regulated by the cam lever 62 and the cam surface 65, and the cam surface 65 is arranged horizontally along the path of movement of the slide plate 50. Therefore, the copying machine is advantageous in that the machine can be made small in size, and especially its height can be reduced.

Figure 2:
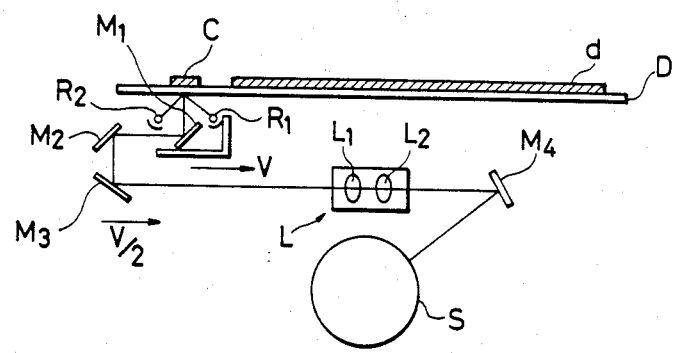
FIG. 2 is an explanatory diagram showing optical components in a variable magnification type copying machine.
Figure 3:
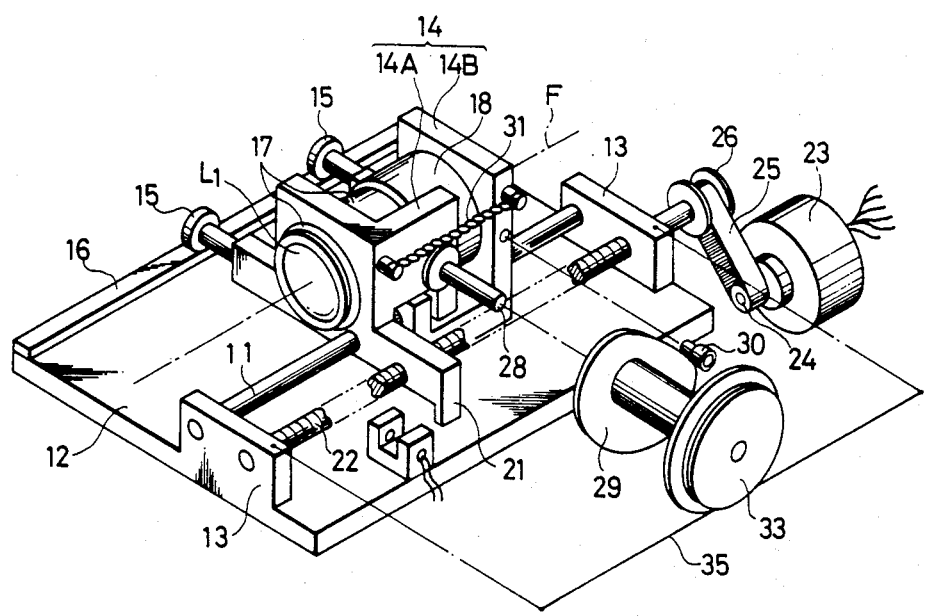
FIG. 3 is a perspective view showing an example of a conventional variable magnification type copying machine.
Figure 4:
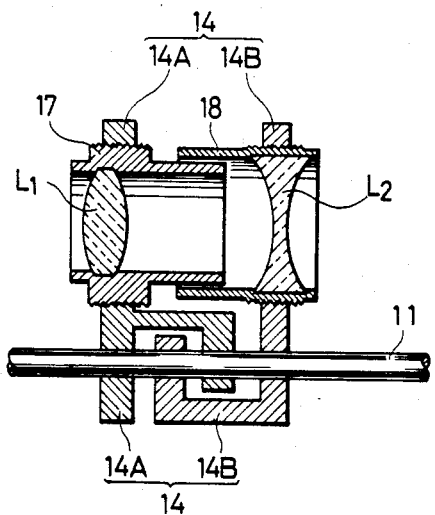
FIG. 4 is a sectional view showing a zoom lens supporting structure in the conventional copying machine in FIG. 3.
Figure 5:
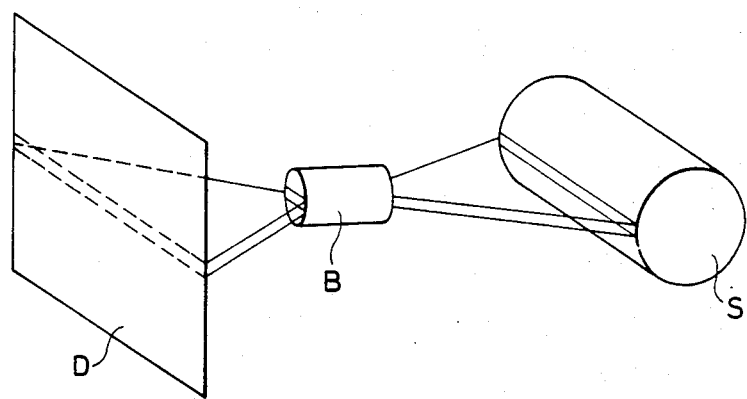
FIG. 5 is a perspective view of essential components for forming a slot-shaped image on a photosensitive drum.

The zoom lens barrel according to the invention is applicable to other variable magnification type copying machines, for instance, that shown in FIG. 2. That is, the zoom lens barrel can be applied to the copying machine of FIG. 2 by providing the movable 43 lens barrel with a radially extending arm inserting the guide bar 11 and the feed screw into the arm, and controlling the position of the rear lens group barrel 42 by the same cam mechanism. In the above-descried variable magnification type copying machine, the original platen is stationary. However, the zoom lens barrel of the invention can be applied to a variable magnification type copying machine in which the original platen is movable.

FIGS. 9 and 10 show other examples of the zoom lens barrel according to the invention. In FIGS. 9 and 10, those elements which have been previously described with reference to FIG. 6 are therefore designated by the same reference numerals and characters.

In the zoom lens barrel shown in FIG. 9, an annular groove 81 is formed in the outer wall of the front lens group frame 41 in such a manner that it is extended circumferentially. An eccentric adjusting pin 84, having an adjusting head 83 engaged with the annular groove 81, is rotatably inserted into the hole 82. The eccentric adjusting pin 84 has an annular groove 85, V shaped in section, in the cylindrical surface thereof. The adjusting pin 84 is held by a retaining screw 86 having a conical end engaged with the annular groove 85. Rotation of the adjusting pin 84 is prevented by tightening the retaining screw 86.

In the second example shown in FIG. 9, as the eccentric adjusting pin 84 is turned with the retaining screw 86 loosened, its adjusting head 83 is moved in a plane parallel to the optical axis, and accordingly the front lens group frame 41 engaged through the annular groove 83 with the adjusting head 83 is moved along the optical axis. After the position of the front lens group frame has been adjusted, the retaining screw 86 is tightened to fix the eccentric adjusting pin 84. As the adjusting head 83 rides in the annular groove 81, the front lens group frame 41 can rotate freely. After the front lens group frame 41 is turned through a suitable angle, the front lens group frame 41 is fixedly secured to the movable lens barrel 43 with the retaining screw 40.

In the zoom lens barrel of FIG. 10, an intermediate barrel 88 is inserted between the movable lens barrel 43 and the front lens group frame 41. More specifically, the intermediate barrel 88 is threadably engaged with the movable lens barrel 43 through threads 89, and the front lens group frame 41 is rotatably inserted in the intermediate barrel 88. The front lens group frame 41 has a positioning flange 90 at the front end. A step 91, as shown in FIG. 10A is formed in the front end of the intermediate barrel 88 to receive the flange 90. Retaining screws 92 are used to secure the front lens group frame 41 to the intermediate barrel 88. That is, the retaining screws 92 set between the flange 90 and the circular wall (largest diameter) of the step 91 are screwed into the intermediate barrel 88. The front lens group frame 41 is firmly secured to the intermediate barrel 88 by tightening the screws 92.

In the zoom lens barrel of FIG. 10, the position of the front lens group frame 41 in the direction of the optical axis can be adjusted by turning it with respect to the movable lens barrel 43 through the threads 89. By turning the front lens group frame 41 with respect to the intermediate barrel 88, the angular position of the frame 41 can be adjusted without moving it in the direction of the optical axis. After the two adjustments have been accomplished, the retaining screws 40 and 92 are tightened.

In the above-described examples, the front lens group frame 41 and the rear lens group frame 42 are inserted into the single axial hole 44 formed in the movable lens barrel 43. However, these examples may be modified by forming coaxial axial holes of different diameters in the movable lens barrel 43 to receive the front and rear lens group frames.

As is clear from the above description, in the zoom lens barrel for a variable magnification type copying machine according to the invention, the lens frames holding the movable lens groups are inserted into the axial hole of the single movable lens barrel which is moved as the magnification changes. Therefore, the zoom lens barrel is advantageous in that it is simple in construction and the optical axis of the movable lens groups cannot shift or be inclined. The angular position of the lens frame secured to the movable barrel can be adjusted with respect to the movable lens barrel without moving the lens frame in the axial direction. Therefore, in a lens system used for forming a slit-shaped image on a photosensitive element, the most suitable angular position of the lens frame can be readily obtained, and furthermore fine adjustment of the focal length can be readily achieved. Accordingly, the best part of the performance of the lens system can be utilized for the light beam applied in the form of a slit to the photosensitive element. Therefore, the zoom lens system of the invention, unlike the conventional zoom lens system in which the lenses cannot be turned for best performance, exhibits an excellent optical performance without having to provide uniform performance over an entire circular area. Thus, the zoom lens system for variable magnification type copying machines according to the invention can be manufactured at a relatively low cost.

I claim:

1. In a variable magnification type copying machine in which a zoom lens having at least two movable lenses is arranged between an original surface and a photosensitive surface, and the positions of said movable lenses and the distance between said movable lenses are changed to vary the copying magnification thereof, the improvement wherein:

said movable lenses of said zoom lens are fixedly held by respective movable lens frames, said movable lens frames are inserted into an axial hole formed in a single movable lens barrel which is moved in the axial direction as the magnification of said zoom lens is varied, at least one of said movable lens frames is fixedly secured to said movable lens barrel, while the other movable lens frame is supported in said movable lens barrel in such a manner as to be moved in the axial direction as the magnification changes, and said one movable lens frame comprises first means for adjusting an angular position of said one movable lens frame with respect to said movable lens barrel without moving said one movable lens frame in the axial direction, and second means for adjusting a position of said one movable lens frame in an axial direction thereof.

2. The zoom lens barrel as claimed in claim 1, in which said first and second adjusting means for said one movable lens frame which is fixedly secured to said movable lens barrel comprise:

a movable lens frame mounted in said movable lens barrel in such a manner that said movable lens frame is rotatable and movable in an axial direction in said movable lens barrel, an annular groove being formed in a front end portion of said movable lens frame protruding from said movable lens barrel;

an adjusting screw screwed into a front end face of said movable lens barrel, said adjusting screw having an interlocking plate inserted in said annular groove; and a retaining screw for securing said movable lens frame to said movable lens barrel.

3. The zoom lens barrel as claimed in claim 1, in which said first and second adjusting means for said one movable lens frame which is fixedly secured to said movable lens barrel comprise:

a movable lens frame mounted in said movable lens barrel in such a manner that said movable lens frame is rotatable and movable in an axial direction in said movable lens barrel, said movable lens frame having an annular groove formed in the outer wall thereof;

an eccentric adjusting pin having an adjusting head inserted into said annular groove of said movable lens barrel, said eccentric adjusting pin being rotatably inserted in a hole formed in said movable lens barrel and extending radially; and a retaining pin for inhibiting rotation of said eccentric adjusting pin.

4. The zoom lens barrel as claimed in claim 1, in which said first and second adjusting means for said one movable lens frame which is fixedly secured to said movable lens barrel comprise:

an intermediate barrel arranged between said movable lens barrel and said one movable lens frame in such a manner that said one movable lens frame is rotatably inserted into said intermediate barrel, said intermediate barrel being threadably engaged with said movable lens barrel;

a retaining screw for fixedly securing said intermediate barrel to said movable lens barrel; and retaining screws for fixedly securing said one movable lens frame to said intermediate barrel.

* * * * *